United States Patent
Saebo et al.

(10) Patent No.: US 10,119,098 B2
(45) Date of Patent: Nov. 6, 2018

(54) CONCENTRATION OF FATTY ACID ALKYL ESTERS BY ENZYMATIC REACTIONS WITH GLYCEROL

(75) Inventors: Per Christian Saebo, Volda (NO); Inge Bruheim, Volda (NO); Daniele Mancinelli, Orsta (NO); Asgeir Saebo, Eidsnes (NO)

(73) Assignee: EPAX NORWAY AS, Alesund (NO)

( * ) Notice: Subject to any disclaimer, the term of this patent is extended or adjusted under 35 U.S.C. 154(b) by 996 days.

(21) Appl. No.: 11/438,833

(22) Filed: May 23, 2006

(65) Prior Publication Data

US 2006/0286266 A1 Dec. 21, 2006

Related U.S. Application Data

(60) Provisional application No. 60/683,749, filed on May 23, 2005.

(51) Int. Cl.

| | |
|---|---|
| C12P 7/64 | (2006.01) |
| C11C 3/06 | (2006.01) |
| A23D 9/013 | (2006.01) |
| C11C 1/00 | (2006.01) |
| C11C 3/02 | (2006.01) |
| A23K 20/158 | (2016.01) |
| A23L 29/00 | (2016.01) |
| A23L 33/12 | (2016.01) |

(52) U.S. Cl.
CPC .............. *C11C 3/06* (2013.01); *A23D 9/013* (2013.01); *A23K 20/158* (2016.05); *A23L 29/04* (2016.08); *A23L 33/12* (2016.08); *C11C 1/005* (2013.01); *C11C 3/02* (2013.01)

(58) Field of Classification Search
None
See application file for complete search history.

(56) References Cited

U.S. PATENT DOCUMENTS

| | | | |
|---|---|---|---|
| 4,004,041 A | 1/1977 | Koslowsky | |
| 4,826,767 A | 5/1989 | Hansen | |
| 5,177,013 A | 1/1993 | Usui | |
| 5,190,868 A | 3/1993 | Kokusho | |
| 5,219,744 A * | 6/1993 | Kurashige et al. | 435/135 |
| 5,288,619 A * | 2/1994 | Brown et al. | 435/134 |
| 5,427,814 A * | 6/1995 | Loliger et al. | 426/610 |
| 6,107,334 A * | 8/2000 | Chilton | 514/464 |
| 6,518,049 B1 * | 2/2003 | Haraldsson et al. | 435/134 |
| 2003/0175914 A1 * | 9/2003 | Baldenius et al. | 435/134 |
| 2005/0233426 A1 * | 10/2005 | Schoerken et al. | 435/134 |

FOREIGN PATENT DOCUMENTS

| | | | | |
|---|---|---|---|---|
| JP | 61100196 | * | 5/1986 | ............... C12P 7/64 |
| JP | S62-058992 | | 3/1987 | |
| JP | 01252294 | * | 6/1989 | ............... C12P 7/68 |
| JP | H10-195023 | | 7/1998 | |
| JP | 2004-285182 | | 10/2004 | |
| WO | WO 91/16443 | | 10/1991 | |
| WO | WO 97/18320 | * | 5/1997 | ............... C12P 7/64 |
| WO | WO 9947135 | | 9/1999 | |
| WO | WO 00/49117 | * | 8/2000 | ............... C11C 3/02 |
| WO | WO 0049117 | | 8/2000 | |
| WO | WO 0073254 | | 12/2000 | |
| WO | WO 2004/043894 | | 5/2004 | |

OTHER PUBLICATIONS

Xu, Xuebing, "Engineering of enzymatic reactions and reactors for lipid modification and synthesis", Eur. J. Lipid Sci. Technol., 2003, vol. 105, pp. 289-304.*
Torres et al., "Esterification of Glycerol with Conjugated Linoleic Acid and Long Chain Fatty Acids from Fish Oil", JAOCS, Nov. 2001, vol. 78, No. 11, pp. 1093-1098.*
PTO-14/3388 translation of JP 01252294 provided by the USPTO on May 2014, 16 pgs.*
Chowdary et al. "The influence of water activity on the lipase catalyzed synthesis of butyl butyrate by transesterification" Process Biochemistry 38 (2002) 393-397.*
Shimada 1998 "Purification of Ethyl Docosahexaenoate by Selective Alcoholysis of Fatty Acid Ethyl Esters with Immobilized Rhizomucor miehei Lipase" JAOCS 75, 1565-1571 (1998).*
Shimada 1997 "Enrichment of Ethyl Docosahexaenoate by Selective Alcoholysis with Immobilized Rhizopus delemar Lipase" Journal of Fermentatioann D Bioengineering vol. 84, No. 2, 138-143. 1997.*
Steinke et al. "High-Yield Preparation of Wax Esters via Lipase-Catalyzed Esterification Using Fatty Acids and Alcohols from Crambe and Camelina Oils" J. Agric. Food Chem. 2001, 49, 647-651.*
MycoBank "Mucor miehei" 3 pgs, accessed May 1, 2015 at http://www.mycobank.org/Biolomics.aspx?Table=Mycobank&MycoBankNr_=334530.*
ChemIDplus, "Substance Name: Microbial rennet, rhizomucor miehei" 1 pg, accessed on May 1, 2015 on http://chem.sis.nlm.nih.gov/chemidplus/rn/977017-76-7.*
Arnar Halldorsson; Lipase selectivity toward fatty acids commonly found in fish oil; Eur. J. Lipid Science Technology 106; 2004; pp. 79-87; Wiley-VCH Verlag GmbH & Co. KGaA, Weinheim.
Yi-Hsu Ju et al.; High-Purity γ—Linolenic Acid from Borage Oil Fatty Acids, JAOCS, vol. 79, No. (2002), pp. 29-32.

* cited by examiner

*Primary Examiner* — Thane Underdahl
(74) *Attorney, Agent, or Firm* — Arent Fox LLP

(57) ABSTRACT

An enzymatic process for the kinetic separation of alkyl esters under organic solvent free conditions is disclosed. Alkyl esters obtained from e.g. fish oil are reacted with glycerol, in the presence of water, at different rates in an evacuated chamber. The reaction is terminated prior to reaching equilibrium and the enriched alkyl ester fraction is isolated from the reaction mixture by short path distillation.

17 Claims, 1 Drawing Sheet

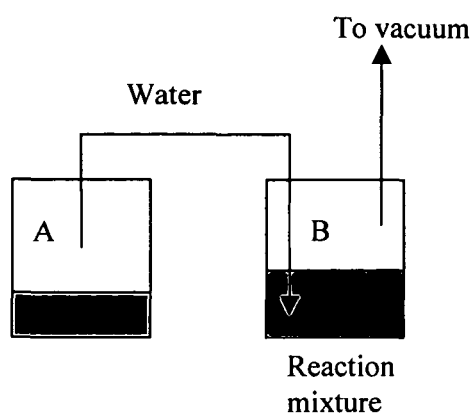
Schematic drawing of the experimental setup.

CONCENTRATION OF FATTY ACID ALKYL ESTERS BY ENZYMATIC REACTIONS WITH GLYCEROL

This application claims the benefit of U.S. Provisional Patent Application Ser. No. 60/683,749 filed May 23, 2005, which is herein incorporated by reference in its entirety.

FIELD OF THE INVENTION

The invention disclosed is within the field of enzymatic processes for the concentration of fatty acid alkyl esters.

BACKGROUND OF THE INVENTION

Triglycerides obtained from natural sources consist of numerous different fatty acids which may vary in the number of carbons, substitution pattern, degree of unsaturation as well as stereo chemistry. In fish oil for example, over 50 different fatty acids have been found including the commercially important and biological active omega-3 fatty acids: eicosapentaenoic acid (EPA), decosahexaenoic acid (DHA) and docosapentanoic acid (DPA). Omega-3 fatty acids have been associated with beneficial health effects for humans and animals, especially in the area of cardiovascular disease, inflammation and cognitive function and development [1-3]. Therefore, there is a desire to purify the omega-3 fatty acids from sources such as fish oil, algae oil and seal oil.

In vegetable oil, a number of different fatty acid can be found as well, such as trans-11 oleic acid (vaccenic acid) and cis-6,9,12 octadecatrienoic acid (gamma-linolenic acid (GLA)). Dehydrated hydrogenated castor oil is a good source for vaccenic acid, whereas borage oil and evening primrose oil are good sources for GLA. GLA is a fatty acid that has been linked to positive health effects as well, such as the modulation of the immune system, treatment of atopic eczema, rheumatoid arthritis, diabetic neuropathy and cirrhosis of the liver [4]. Milk fat represents another source of bioactive fatty acids like trans-vaccenic acid and conjugated fatty acids.

Due to the strong positive biological effects of several fatty acids, fatty acids can be used as food supplements, as food/feed ingredients as well as pharmaceuticals. However, the concentration of e.g. omega-3 fatty acids in natural sources are low, therefore there is a need for a process that can increase the concentration of the desired fatty acids. Previously, short path distillation, low temperature solvent crystallization, solvent winterization and urea complexation have been utilized.

These methods are expensive and time consuming thereby contributing to the high processing costs of the concentrated fatty acids. Recently, enzymatic reactions (hydrolysis, esterification etc.) have been contemplated and explored as ways of enriching DHA/EPA as free fatty acids [5], ethyl esters [6] or as hexyl esters [7]. In addition, the technology has been used to enrich GLA as a free fatty acids [8] and isomers of conjugated linoleic acid (CLA) [9] as alkyl esters. The limitation of those methods are either the low yield of the final product, or the number of processing steps, both having a direct impact on the cost of the product.

Accordingly, what is needed is a process that is simpler, consisting of fewer processing steps, resulting in a product of higher purity in a higher yield. Large volumes of EPA/DHA are supplied to the world marked as ethyl esters. Therefore, enriching EPA/DHA as ethyl esters would save processing steps and thereby time and costs.

SUMMARY OF THE INVENTION

In a first aspect, the invention provides a method for the separation of fatty acids alkyl esters by reacting the alkyl esters in a one-step process with glycerol. The reaction is catalyzed by an enzyme, in an evacuated vessel in the presence of water which is allowed to enter from a second vessel. The reaction conditions are chosen so that the substrates react with glycerol at different rates. The reaction is terminated prior to reaching equilibrium in order to obtain a change in the composition of the fatty acid alkyl ester fraction compared to the initial composition. Due to the large difference in volatility between fatty acid alkyl esters and the reaction products (mono-, di- and tri-glycerides), the purified alkyl ester composition can be obtained in a high yield using short path distillation. The fatty acid alkyl esters, used as a starting material, can be prepared from marine sources such as fish oil and algae oil, from vegetable sources such as castor oil, evening primrose oil and borage oil or from animal sources such as seal oil and whale oil. Depending on the sources, the process described can be used to prepare concentrates of alkyl esters. Non-limiting examples of such alkyl esters are EPA ethyl ester, DHA ethyl ester, DPA ethyl ester, GLA ethyl ester and vaccenic acid ethyl ester.

Another aspect of the invention are fatty acid alkyl ester compositions arising from the processes described above. In addition food/feed products, food supplements and pharmaceuticals further comprising said compositions arising from the processes described above.

Yet another embodiment of the invention is a novel lipid composition comprising fatty acid alkyl esters, glycerides and free fatty acids. Said fatty acid alkyl esters have an iodine value 1.1 times higher or greater than said glycerides. The amount of said free fatty acids in said composition is less than 50% (w,w). Said composition can be safely consumed by an animal or a human.

In some embodiments, the present invention provides processes for the separation of fatty acid alkyl esters comprising esterifying a mixture of the fatty acid alkyl ester, glycerol, with a catalytically effective amount of an enzyme so that the glycerol esterifies the fatty acid alkyl esters at different rates and terminating the esterification reaction before all the fatty acid alkyl esters are esterified. In still further embodiments, the present invention provides enzymatic fatty acid separation processes, comprising the step of agitating fatty acids in a mixture at a temperature effective to cause the glycerol to begin esterify the fatty acid alkyl esters at different rates, while removing volatile reaction products from the reaction mixture. In still other embodiments, the present invention provides enzymatic fatty acid separation processes comprising the step of terminating the esterification reaction before all the fatty acid alkyl esters are esterified.

DESCRIPTION OF THE FIGURES

FIG. 1 is a schematic depiction of the process for the separation of fatty acid alkyl esters by an enzymatic reaction between fatty acids alkyl esters and glycerol (at different rates) in an evacuated vessel (B).

DEFINITIONS

As used herein, the term "food product" refers to any food or feed suitable for consumption by humans. The "food product" may be a prepared and packaged food (e.g., mayonnaise, salad dressing, bread, or cheese food) or an animal feed (e.g., extruded and pelleted animal feed or coarse mixed feed).

As used herein, the term "animal feed" refers to any feed suitable for consumption by an animal.

As used herein, the term "infant food" refers to a food product formulated for an infant such as formula.

As used herein, the term "food supplement" refers to a food product formulated as a dietary or nutritional supplement to be used as part of a diet.

As used herein, the term "omega-3 fatty acid" refers to polyunsaturated fatty acids that have the final double bond in the hydrocarbon chain between the third and fourth carbon atoms from the methyl end of the molecule. Non-limiting examples of omega-3 fatty acids include, 5,8,11,14,17-eicosapentaenoic acid (EPA), 4,7,10,13,16,19-docosahexanoic acid (DHA), 7,10,13,16,19-docosapentanoic acid (DPA), 9,12,15-octadecatrienoic acid (ALA), and 6,9,12,15-octadecatetraenoic acid (SDA).

As used herein, the term "omega-6 fatty acid" refers to polyunsaturated fatty acids that have the final double bond in the hydrocarbon chain between the 6th and 7th carbon atoms from the methyl end of the molecule. Non-limiting example of omega-6 fatty acids include cis-6,9,12 octadecatrienoic (GLA)

As used herein, the term "fish oil" refers to any oil obtained from a marine source e.g. tuna oil, seal oil and algae oil.

As used herein, the term "lipase" refers to any enzyme capable of hydrolyzing fatty acid esters.

As used herein, the term "volatile reaction product" refers to water and alcohol with 1 to 12 carbons.

As used herein, the term "fatty acid alkyl ester" refers to a derivative of a fatty acid. The fatty acid has a chain length from 1 to 24 carbons and double bonds ranging from 0 to 6. The derivative can be an alkyl group with 1 to 12 carbons. Any alkyl group found suitable is contemplated such as branched, unsaturated and substituted alkyl chains.

As used herein, the term "catalytically effective amount" refers to the minimum amount of a catalyst needed to obtain a catalytic reaction.

DESCRIPTION OF THE INVENTION

This invention discloses a process for the separation of fatty acid alkyl esters by an enzymatic reaction between fatty acids alkyl esters and glycerol (at different rates) in an evacuated vessel (B). A reduced pressure is applied to vessel B and water vapor (moisture) is allowed to enter the reaction mixture through a tube from a second vessel (A) (see FIG. 1 for schematic drawing of the experimental setup). The invention is not limited to addition of water from a separated vessel. Other means of adding water vapor/humidity in a slow and controlled manner would also be within the scope of this invention.

The reaction is terminated prior to reaching equilibrium and the enriched fatty acids alkyl ester fraction is isolated from the glycerides using short path distillation. The amount of glycerol, the amount and type of enzyme as well as the reaction time and temperature need to be optimized for each application. These parameter settings will depend on the chemical nature of the initial composition, time available as well as the final composition attempted made. The present invention is not limited to the use of any particular enzyme. Indeed, the use of a variety of enzymes is contemplated, including, but not limited to *Thermomyces Lanuginosus* lipase, *Rhizomucor miehei* lipase, *Candida Antarctica* lipase, *Pseudomonas fluorescence* lipase, and *Mucor javanicus* lipase. Depending on the polarity of the enzyme and/or enzyme carrier dispersing the immobilized enzyme (e.g. TL-IM) into the non-polar reaction mixture may be difficult. In order to stabilize the emulsion lecithin is added.

This invention is not limited to any particular fatty acid alkyl ester either. Any fatty acid alkyl ester that will react at a different rate with glycerol using the process disclosed is contemplated. This includes, but not limited to: decanoic acid (10:0), undecanoic acid (11:0), 10-undecanoic acid (11:1), lauric acid (12:0), cis-5-dodecanoic acid (12:1), tridecanoic acid (13:0), myristic acid (14:0), myristoleic acid (cis-9-tetradecenoic acid, 14:1), pentadecanoic acid (15:0), palmitic acid (16:0), palmitoleic acid (cis-9-hexadecenoic acid, 16:1), heptadecanoic acid (17:1), stearic acid (18:0), elaidic acid (trans-9-octadecenoic acid, 18:1), oleic acid (cis-9-octadecanoic acid, 18:1), nonadecanoic acid (19:0), eicosanoic acid (20:0), cis-11-eicosenoic acid (20:1), 11,14-eicosadienoic acid (20:2), heneicosanoic acid (21:0), docosanoic acid (22:0), erucic acid (cis-13-docosenoic acid, 22:1), tricosanoic acid (23:0), tetracosanoic acid (24:0), nervonic acid (24:1), pentacosanoic acid (25:0), hexacosanoic acid (26:0), heptacosanoic acid (27:0), octacosanoic acid (28:0), nonacosanoic acid (29:0), triacosanoic acid (30:0), vaccenic acid (t-11-octadecenoic acid, 18:1), tariric acid (octadec-6-ynoic acid, 18:1), and ricinoleic acid (12-hydroxyoctadec-cis-9-enoic acid, 18:1) and ω3, ω6, and ω9 fatty acyl residues such as 9,12,15-octadecatrienoic acid (α-linolenic acid) [18:3, ω3]; 6,9,12,15-octadecatetraenoic acid (stearidonic acid) [18:4, ω3]; 11,14,17-eicosatrienoic acid (dihomo-α-linolenic acid) [20:3, ω3]; 8,11,14,17-eicosatetraenoic acid [20:4, ω3], 5,8,11,14,17-eicosapentaenoic acid [20:5, ω3]; 7,10,13,16,19-docosapentaenoic acid [22:5, ω3]; 4,7,10,13,16,19-docosahexaenoic acid [22:6, ω3]; 9,12-octadecadienoic acid (linoleic acid) [18:2, ω6]; 6,9,12-octadecatrienoic acid (γ-linolenic acid) [18:3, ω6]; 8,11,14-eicosatrienoic acid (dihomo-γ-linolenic acid) [20:3 ω6]; 5,8,11,14-eicosatetraenoic acid (arachidonic acid) [20:4, ω6]; 7,10,13,16-docosatetraenoic acid [22:4, ω6]; 4,7,10,13,16-docosapentaenoic acid [22:5, ω6]; 6,9-octadecadienoic acid [18:2, ω9]; 8,11-eicosadienoic acid [20:2, ω9]; 5,8,11-eicosatrienoic acid (Mead acid) [20:3, ω9]; t10,c12 octadecadienoic acid; c10,t12 octadecadienoic acid; c9,t11 octadecadienoic acid; and t9,c11 octadecadienoic acid. Moreover, acyl residues may be conjugated, hydroxylated, epoxidated or hydroxyepoxidated acyl residues.

In the case of enriching the DHA ethyl ester from a composition consisting of 10% EPA and 50% DHA the following conditions were used: reaction time (24 hours), glycerol (13%), *Rhizomucor Miehei* Lipase (RM-IM) (13%), ethyl ester (74%) reaction temperature (40° C.) and pressure (0.1-1 mbar). The reaction was terminated before reaching equilibrium, the product was then isolated using short path distillation and consisted of fatty acids alkyl esters (83%), glycerides (14%) and free fatty acids (3%). After 24 hours the content of DHA in the ethyl ester fraction had been raised from 50% to 74%. By reducing the reaction temperature to 25° C., the selectivity was increased further, and a DHA concentration of 84% was reached after 37 hours. The level of the omega-6 fatty acids arachidonic acid (AA) was also reduced from 0.6% to 0.27% after 41 hours. In some embodiments it may be useful to lower the concentration of AA in a product as AA is a pro-inflammatory precursor. Chronic inflammation has been linked to several conditions such as cardiovascular disease, metabolic syndrome and diabetes type 2 [10-12].

In one embodiment, the process can be used to enrich DHA alkyl ester, EPA alkyl ester and/or DPA alkyl ester from a mixture comprising such fatty acid alkyl ester such as ethylated fish oil, algae oil and/or seal oil. Non-limiting examples of fish oil can be oils obtained from cold pressing tuna, sardines or it can be cod liver oil.

In another embodiment, the process can be used to enrich GLA alkyl ester from a source rich in GLA such as ethylated borage oil or ethylated evening primrose oil. This invention discloses that the GLA concentration was increased from 20% to 66.7% by reacting ethylated borage oil with glycerol.

In a further embodiment, the process can be used to enrich vaccenic acid from a mixture of dehydrated hydrogenated castor oil ethyl esters or partially hydrogenated conjugated linoleic acid as well as from other sources.

In yet another embodiment, a CLA ethyl ester isomer such as cis-9, trans-11 can be enriched from a mixture of CLA ethyl ester isomers such as: cis-9, cis-11; cis-9, trans-11; trans-9, cis-11; trans-9, trans-11; cis-10, cis-12; cis-10, trans-12; trans-10, cis-12 and trans-10, trans-12.

The present invention is not limited to any particular mechanism. Indeed, an understanding of the mechanism is not necessary to practice the present invention. Nevertheless, the reaction between alkyl esters and glycerol is slow according to our observations and others [5]. The addition of small amounts of water increases the speed of the reaction, however it is not clear at the molecular level by which mechanism. Due to the fact that there is no increase in acid value during the reaction (acid value ranging from 2.8 to 3.4), it is reasonable to believe that the reaction takes place between the fatty acid alkyl esters and the glycerol directly. It is contemplated that the water enhances the activity of the enzyme and that free fatty acids are not intermediates in this process.

This invention provides an improvement compared to the prior art in the respect that fatty acid alkyl esters can be enriched directly without the conversion into free fatty acids. Large volumes of concentrated fatty acid alkyl esters are commercially available on the world market. With this invention, 1-3 process steps can be saved, thereby reducing the time and cost of the enrichment process. Furthermore, the yields can be increased since the volatility between e.g. DHA ethyl ester and the glycerides is larger than DHA as free fatty acid and the glycerides. Glycerides are the reaction products that are formed when the fatty acid alkyl ester is reacted with glycerol.

EXAMPLES

Example 1

100 g ethyl esters (10% EPA and 50% DHA (relative peak area)), 13 g glycerol and 13 g immobilized *rhizomucor miehei* lipase (RM-IM) from Novozymes (Bagsvaerd, Denmark) were mixed in a reaction vessel and stirred. The reaction was performed at 40° C. (pressure of 0.1-1 mbar) with water/vapor entering from a second separate vessel (se FIG. 1 above for schematics). Samples were collected from the reaction mixture after 8, 16 and 24 hours and analyzed by GC-FID. The results showed that the DHA content in the ethyl ester fraction was 61%, 70% and 74% after 8, 16 and 24 hours, respectively. After 24 hours the amount of ethyl esters was reduced to approximately 40% and the level of free fatty acids had increased to approximately 2%. The amount water consumed from the second vessel was about 40% relative to the initial amount of ethyl ester. Next, the enzymes were removed by filtration and the mixture was degassed and distilled using short path distillation in order to separate the ethyl ester fraction from the glycerides. GC analysis showed that the final distillate contained 83% ethyl ester, 14% monoglyceride and 2-3% free fatty acids. The residue consisted of mainly glycerides (mono-, di- and tri-glycerides), but also 5% ethyl esters and 0.5-1% free fatty acids.

Example 2

The experiment was performed under identical conditions as in example 1, except that 4.3 g glycerol, 4.3 g RM-IM and 33 g of ethyl ester (10% EPA and 50% DHA) were reacted at a temperature of 25° C. After 29 hours, 37 hours and 41 hours the ethyl ester fraction contained 81% DHA, 84% DHA and 80% DHA, respectively. The level of AA was reduced from 0.7% at 0 hours to 0.26% after 41 hours. The reaction consumed 9 g of water. The acid value was in the range of 5 to 8.

Example 3

The experiment was performed under identical conditions as in example 1, except that a 100 g fatty acid ethyl esters (ethylated borage oil rich in GLA), 13 g glycerol, 0.34 g lecithin and 13.7 g immobilized *Thermomyces Lanoginusus* (TL-IM) from Novozymes (Bagsvaerd, Denmark) were reacted at a temperature of 50° C. At start, the concentration of GLA ethyl ester was 20% and the ratio between 18:1, 18:2 and 18:3 peaks was 1:2:1. After 2 hours the concentration of GLA was increased to 34.8% and the 18:1, 18:2 and 18:3 ratio was changed to 1:3:3. After 5 hours the concentration of GLA was increased to 42.4% and the ratio of 18:1, 18:2 and 18:3 was 1:3:4. After 23 hours the concentration of GLA was increased to 67% and the ratio of 18:1, 18:2 and 18:3 was 1:3:11. The amount water consumed during the reaction was 547 g.

Example 4

The same experiment as in example 3 was performed, except that no lecithin was added. The experiment was terminated after 40 hours and the results showed that no reaction had occurred.

Example 5

The experiment was performed under identical conditions as in example 1, except that a 300 g fatty acid ethyl esters (ethylated seal oil), 40 g glycerol, 1 g lecithin and 45 g TL-IM were reacted at a temperature of 50° C. Seal oil is a marine source rich in the omega-3 fatty acid EPA, DHA and DPA. After 25 hours the experiment was terminated. The DHA concentration was increased from 8% to 11.9%, the DPA concentration was increased from 3.2 to 3.7% and the EPA concentration was increased from 7.1 to 8.2%. 50 g of water was consumed during the reaction. The acid value increased from 0.5 at the start to 7.9 after 25 hours.

What should be clear from above is that the present invention provides novel methods for enriching fatty acid alkyl esters. All publications and patents mentioned in the above specification are herein incorporated by reference. Various modifications and variations of the described method and system of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention which are obvious to those skilled in medicine, biochemistry, or related fields are intended to be within the scope of the following claims.

REFERENCES

[1] J. A. Nettleton: Omega-3 fatty acids and health. Chapmand and Hall, New York (USA) 1995.
[2] Richardson A J and Montgomery P. *Pediatrics* 115 (2005) 1360.
[3] Kremer J M. *Am J Clin Nutr* 71 (2000) 249.
[4] Beganriu S, Farmacia 44 (1996) 3-4.
[5] U.S. Pat. No. 6,518,049; Lipase-Catalyzed Esterification of Marine Oil.
[6] Halldorsson A, Kristinsson B, Haraldssson G G, *Eur. J. Lipid Sci. Technol.* 106 (2004) 79.
[7] WO2004043894; Lipase-Catalyzed Esterification of Marine Oil.
[8] Ju Y and Chen T, *JOACS,* 79 (2002) 29.
[9] WO9718320; Process for the preparation of materials with a high content of long chain polyunsaturated fatty acids.
[10] Libby P. *Am J Clin Nutr* 83 (2006) 456S.
[11] Sacks F M and Campos H. *J. Clin. Endocrin. Metabol.* 91 (2006) 398.
[12] Tracy R P. *Int. J. Clin Pract,* 134 (2003) 10-17.

The invention claimed is:

1. A method of obtaining a fatty acid ester composition having an increased concentration of at least one alkyl ester, and formulating the same, the method comprising the steps:
   (a) combining (1) an initial fatty acid ester composition comprising a plurality of different fatty acid esters each at an initial concentration, wherein the plurality of different fatty acid esters comprises at least one alkyl ester selected from the group consisting of cis-6,9,12 octadecatrienoic (GLA) ethyl ester and docosahexaenoic acid (DHA) alkyl ester, (2) glycerol and (3) a catalytically effective amount of an enzyme, to form a mixture, wherein the enzyme is *rhizomucor miehei* lipase;
   (b) subjecting the mixture to reaction conditions under reduced pressure of between about 0.1-1.0 mbar and in the presence of water, wherein the water is added as water vapor such that the at least one alkyl ester esterifies with the glycerol at a lower rate as compared to other fatty acid esters in the initial fatty acid ester composition, to provide reaction products comprising (1) a glyceride composition and (2) a modified fatty acid ester composition comprising the at least one alkyl ester, wherein the at least one alkyl ester is present in the modified fatty acid ester composition at a concentration that is at least 11 percentage points more than an initial concentration of the at least one alkyl ester in the initial fatty acid ester composition;
   (c) separating the modified fatty acid ester composition from the glyceride composition; and
   (d) formulating the modified fatty acid ester composition as a food product, a feed product, a food supplement or a pharmaceutical product suitable for consumption by an animal or a human.

2. The method of claim 1, wherein the reaction is terminated after a desired concentration of the at least one alkyl ester is reached.

3. The method of claim 1, wherein the reaction conditions comprise agitating the mixture at temperatures between 25° C. and 50° C.

4. The method of claim 1, wherein the separating step comprises short path distillation.

5. The method of claim 1, wherein the separating step comprises removing volatile reaction products from the mixture.

6. The method of claim 1, wherein the fatty acid ester composition is derived from one or more oils selected from the group consisting of fish oil, algae oil, castor oil, evening primrose oil, borage oil, seal oil and whale oil.

7. The method of claim 1, wherein the fatty acid ester composition is derived from fish oil.

8. The method of claim 1, wherein the mixture further comprises a stabilizer.

9. The method of claim 1, wherein the initial fatty acid ester composition and the glycerol are present in the mixture at an initial fatty acid ester composition:glycerol ratio of about 5:1 to about 8:1.

10. The method of claim 1, wherein said formulating step comprises formulating the modified fatty acid ester composition as a food supplement or a pharmaceutical product suitable for consumption by a human.

11. A method of obtaining a fatty acid ester composition having an increased concentration of at least one alkyl ester, formulating and consuming of the same, the method comprising the steps:
   (a) combining (1) an initial fatty acid ester composition comprising a plurality of different fatty acid esters each at an initial concentration, wherein the plurality of different fatty acid esters comprises at least one alkyl ester selected from the group consisting of cis-6,9,12 octadecatrienoic (GLA) ethyl ester and docosahexaenoic acid (DHA) alkyl ester, or (2) glycerol and (3) a catalytically effective amount of an enzyme, to form a mixture, wherein the enzyme is *rhizomucor miehei* lipase;
   (b) subjecting the mixture to reaction conditions under reduced pressure of between about 0.1-1.0 mbar and in the presence of water, wherein the water is added as water vapor such that the at least one alkyl ester esterifies with the glycerol at a lower rate as compared to other fatty acid esters in the initial fatty acid ester composition, to provide reaction products comprising (1) a glyceride composition and (2) a modified fatty acid ester composition comprising the at least one alkyl ester, wherein the at least one alkyl ester is present in the modified fatty acid ester composition at a concentration that is at least 11 percentage points more than an initial concentration of the at least one alkyl ester in the initial fatty acid ester composition;
   (c) separating the modified fatty acid ester composition from the glyceride composition;
   (d) formulating the modified fatty acid ester composition as a pharmaceutical product suitable for consumption by a human; and
   (e) consuming of the pharmaceutical product by a human.

12. The method of claim 11, wherein the reaction conditions comprise agitating the mixture at temperatures between 25° C. and 50° C.

13. The method of claim 11, wherein the separating step comprises removing volatile reaction products from the mixture.

14. The method of claim 11, wherein the fatty acid ester composition is derived from one or more oils selected from the group consisting of fish oil, algae oil, castor oil, evening primrose oil, borage oil, seal oil and whale oil.

15. The method of claim 11, wherein the fatty acid ester composition is derived from fish oil.

16. The method of claim 11, wherein the mixture further comprises a stabilizer.

17. The method of claim 11, wherein the initial fatty acid ester composition and the glycerol are present in the mixture at an initial fatty acid ester composition:glycerol ratio of about 5:1 to about 8:1.

* * * * *